(12) United States Patent
Kiley et al.

(10) Patent No.: US 7,905,540 B2
(45) Date of Patent: Mar. 15, 2011

(54) MODULAR ARCHITECTURE FOR COMBAT TACTICAL VEHICLE

(75) Inventors: Matthew P. Kiley, Allison Park, PA (US); Miloslav Novak, Glenshaw, PA (US); Gregory L. Peer, Delmont, PA (US); Edward A. Timko, Jeannette, PA (US); Daniel Bergstrom, Sarver, PA (US); Jeffrey M Shoup, Delmont, PA (US); Deryck H. Serrano, Greensburg, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 12/178,738

(22) Filed: Jul. 24, 2008

(65) Prior Publication Data

US 2010/0019538 A1    Jan. 28, 2010

(51) Int. Cl.
  *B60J 7/00* (2006.01)
(52) U.S. Cl. .................................. 296/193.04
(58) Field of Classification Search ............. 296/193.04, 296/187.01, 193.01, 29; 114/343, 65 R, 114/77 R; 244/159.4; 280/785
  See application file for complete search history.

(56) References Cited

U.S. PATENT DOCUMENTS

| | | | | |
|---|---|---|---|---|
| 1,411,875 A | * | 4/1922 | Schroeder ..................... 280/783 |
| 2,278,450 A | * | 4/1942 | Jones ......................... 296/24.33 |
| 2,627,426 A | * | 2/1953 | Toneray et al. ................ 280/781 |
| 2,637,592 A | * | 5/1953 | Karlby ...................... 296/193.01 |
| 2,678,231 A | * | 5/1954 | Barenyi .................... 296/193.03 |
| 2,716,032 A | * | 8/1955 | Barenyi ......................... 280/775 |
| 2,716,040 A | * | 8/1955 | Barenyi .................... 296/193.01 |
| 3,131,963 A | * | 5/1964 | Schilberg ....................... 296/204 |
| 3,309,759 A | * | 3/1967 | Vittone ......................... 29/897.2 |
| 3,612,440 A | * | 10/1971 | Strong ............................ 244/2 |
| 4,492,282 A | * | 1/1985 | Appelblatt et al. ............ 180/68.1 |
| 4,573,707 A | * | 3/1986 | Pabst ............................ 280/792 |
| 4,770,262 A | * | 9/1988 | Yasunaga et al. ............. 180/68.1 |
| 4,887,859 A | * | 12/1989 | Aper .......................... 296/26.08 |
| 5,002,309 A | * | 3/1991 | Vecellio ....................... 280/785 |

(Continued)

FOREIGN PATENT DOCUMENTS

WO    WO2008/060318    5/2008

OTHER PUBLICATIONS

International Search Report and Written Opinion of the International Searching Authority dated Mar. 29, 2010 relating to PCT/US2009/051692.

*Primary Examiner* — Kiran B. Patel
(74) *Attorney, Agent, or Firm* — Greenberg Traurig, LLP (57) ABSTRACT

A combat tactical modular vehicle structure including a center frame module comprising a front bulkhead a cab portion and a rear bulkhead where the center frame module includes an integrated armor so that the integrated armor is a part of center frame module or the center frame module has at least one piece of armor attached to the center frame module, a front frame module comprising an engine subframe where the front frame module is connected to the front bulkhead by a plurality of mechanical coupling devices, and a rear frame module comprising a gearbox subframe where the rear frame module is connected to the rear bulkhead by the plurality of mechanical coupling devices for selectively connecting and disconnecting the front frame module to the front bulkhead without substantially affecting the connection and the rear frame module to the rear bulkhead without substantially affecting the connection.

10 Claims, 8 Drawing Sheets

U.S. PATENT DOCUMENTS

| | | | |
|---|---|---|---|
| 5,401,056 A | 3/1995 | Eastman | |
| 5,403,063 A * | 4/1995 | Sjostedt et al. | 296/193.07 |
| 5,573,300 A * | 11/1996 | Simmons | 296/193.04 |
| 5,660,427 A * | 8/1997 | Freeman et al. | 296/190.08 |
| 6,193,273 B1 * | 2/2001 | Novak et al. | 280/781 |
| 6,299,240 B1 * | 10/2001 | Schroeder et al. | 296/203.01 |
| 6,729,830 B2 * | 5/2004 | Wagner et al. | 414/686 |
| 6,755,461 B2 * | 6/2004 | Seksaria et al. | 296/193.04 |
| 6,886,886 B2 * | 5/2005 | Seksaria et al. | 296/193.09 |
| 7,077,714 B2 * | 7/2006 | Brown | 440/12.5 |
| 7,147,075 B2 * | 12/2006 | Tanaka et al. | 180/229 |
| 7,267,394 B1 * | 9/2007 | Mouch et al. | 296/203.02 |
| 7,441,809 B1 * | 10/2008 | Coombs et al. | 280/785 |
| 7,510,199 B2 * | 3/2009 | Nash et al. | 280/124.135 |
| 7,578,523 B2 * | 8/2009 | Kosuge et al. | 280/756 |
| 7,677,649 B2 * | 3/2010 | Hedderly | 296/193.07 |
| 7,690,472 B2 * | 4/2010 | Kato et al. | 180/291 |
| 2003/0085579 A1 * | 5/2003 | Seksaria et al. | 293/133 |
| 2003/0085592 A1 * | 5/2003 | Seksaria et al. | 296/194 |
| 2003/0089545 A1 * | 5/2003 | Seksaria et al. | 180/312 |
| 2003/0188695 A1 * | 10/2003 | Robohm | 119/203 |

* cited by examiner

MODULAR ARCHITECTURE FOR COMBAT TACTICAL VEHICLE

BACKGROUND OF THE INVENTION

The present invention relates to a modular architecture for combat tactical vehicle. More particularly, the present invention relates generally to combat tactical vehicle having a center frame module, a front frame module and rear frame module where the front and rear frame modules are selectively connected to the center frame module by a plurality of mechanical coupling devices.

SUMMARY OF THE INVENTION

The present invention applies the general concept of using modules or assemblies in the manufacturing of combat tactical vehicles. In one embodiment, the present invention provides a combat tactical vehicle structure comprising a center frame module comprising a front bulkhead, a cab portion, and a rear bulkhead where the center frame module includes an integrated armor so that the integrated armor is a part of center frame module, a front frame module comprising an engine subframe, the front frame module being connected to the front bulkhead by a plurality of mechanical coupling devices, and a rear frame module comprising a gearbox subframe, the rear frame module being connected to the rear bulkhead by the plurality of mechanical coupling devices. The front frame module is selectively connected and disconnected to the front bulkhead by the plurality of mechanical coupling devices without substantially affecting the connection. The rear frame module is selectively connected and disconnected to the rear bulkhead by the plurality of mechanical coupling devices without substantially affecting the connection.

In one embodiment, the mechanical coupling device comprises a plurality of mechanical fasteners. In another embodiment the plurality of mechanical fasteners are located in at least a substantially longitudinal direction and a substantially lateral direction when connecting the front frame module to the front bulkhead of the center frame module. In a further embodiment, the plurality of mechanical fasteners are located in at least a substantially longitudinal direction and a substantially lateral direction when connecting the rear frame module to the rear bulkhead of the center frame module. In another embodiment, the plurality of mechanical fasteners comprising a plurality of bolts. In one embodiment, further comprising a plurality of corresponding nuts to each bolt.

In one embodiment, the front bulkhead is made of cast aluminum alloy, forged aluminum alloy, sheet aluminum alloy product, or plate aluminum alloy product.

In another embodiment, the rear bulkhead is made of cast aluminum alloy, forged aluminum alloy, sheet aluminum alloy product, or plate aluminum alloy product.

In one embodiment, the rear frame module is made of extruded aluminum longitudinal beams. In another embodiment, the extruded aluminum longitudinal beams of rear frame module are connected by nodes. In a further embodiment, the nodes are made of aluminum extrusions, forgings or castings.

In still another embodiment, the cab portion comprises a plurality of frame rails and a floor. In one embodiment, the plurality of frame rails are made of aluminum alloy. In another embodiment, the floor is made of an aluminum alloy sheet or plate.

In a further embodiment, a combat tactical vehicle structure comprising a center frame module comprising a front bulkhead, a cab portion, and a rear bulkhead where the center frame module has at least one piece of armor attached to the center frame module, a front frame module comprising an engine subframe, the front frame module being connected to the front bulkhead by a mechanical coupling device and a rear frame module comprising a gearbox subframe, the rear frame module being connected to the rear bulkhead by the mechanical coupling device. The front frame module is selectively connected and disconnected to the front bulkhead by a mechanical coupling device without substantially affecting the connection. The rear frame module is selectively connected and disconnected to the rear bulkhead by a mechanical coupling device without substantially affecting the connection.

In one embodiment, the mechanical coupling device comprises a plurality of mechanical fasteners. In another embodiment, the plurality of mechanical fasteners are located in at least a longitudinal direction and a lateral direction when connecting the front frame module to the front bulkhead of the center frame module. In a further embodiment, the plurality of mechanical fasteners are located in at least a longitudinal direction and a lateral direction when connecting the rear frame module to the rear bulkhead of the center frame module. In another embodiment, the plurality of mechanical fasteners comprising a plurality of bolts. In one embodiment, further comprising a plurality of corresponding nuts to each bolt.

In one embodiment, the front bulkhead is made of cast aluminum alloy, forged aluminum alloy, sheet aluminum alloy product, or plate aluminum alloy product.

In another embodiment, the rear bulkhead is made of cast aluminum alloy, forged aluminum alloy, sheet aluminum alloy product, or plate aluminum alloy product.

In one embodiment, the rear frame module is made of extruded aluminum longitudinal beams. In another embodiment, the extruded aluminum longitudinal beams of rear frame module are connected by nodes. In a further embodiment, the nodes are made of aluminum extrusions, forgings or castings.

In still another embodiment, the cab portion comprises a plurality of frame rails and a floor. In one embodiment, the plurality of frame rails are made of aluminum alloy. In another embodiment, the floor is made of an aluminum alloy sheet or plate.

Accordingly, it is one embodiment of the invention to provide a modular architecture for a combat tactical vehicle.

These and other further embodiments of the invention will become more apparent through the following description and drawings.

BRIEF DESCRIPTION OF THE DRAWINGS

For a fuller understanding of the invention, reference is made to the following description taken in connection with the accompanying drawing(s), in which.

DETAILED DESCRIPTION OF THE PREFERRED EMBODIMENTS

The present invention provides a modular architecture for a tactical combat vehicle.

For purposes of the description hereinafter, the terms "upper", "lower", "right", "left", "vertical", "horizontal", "top", "bottom", and derivatives thereof shall relate to the invention, as it is oriented in the drawing figures. However, it is to be understood that the invention may assume various alternatives and step sequences, except where expressly specified to the contrary. It is also to be understood that the specific elements and processes illustrated in the drawings, and described in the following specification, are simply exemplary embodiments of the invention. Hence, specific dimensions and other physical characteristics related to the embodiments disclosed herein are not to be considered limiting.

The followings are the definitions of the terms used in this application.

As used herein, the term "chassis" means the base or underbody upon which a vehicle is built.

As used herein, the term "frame module" means a load bearing structure having provisions for the mechanical attachment of subassemblies, wherein each flame module includes provisions for the attachment of body sheet panels.

As used herein, the term "module" means a fully assembled unit, either front, center, or rear, that is comprised of "frame module", body panels and armor, and stuffed with automotive and other systems (i.e. front module outfitted with engine, cooling/heating, electrical wiring harness, front exhaust, brake booster, etc.).

As used herein, the term "center frame module" means a frame module corresponding to the crew compartment ("the cab") of the vehicle including provisions for connectivity to a front frame module and a rear frame module. Both front and rear bulkheads are integral parts of the center module.

As used herein, the term "front bulkhead" may be composed of a metal, such as an aluminum alloy, and may be a casting, forging or a sheet/plate product.

As used herein, the term "cab portion" may be referred to as the portion of the center frame module between the front bulkhead and the rear bulkhead that ultimately provides the crew compartment of the vehicle.

As used herein, the term "rear bulkhead" may be composed of a metal, such as an aluminum alloy, and may be a casting, forging or a sheet/plate product.

As used herein, the term "front frame module" means a load bearing structure to which a plurality of subassemblies may be attached, including but not limited to an engine subframe.

As used herein, the term "rear frame module" means a load bearing structure to which a plurality of subassemblies may be attached, including but not limited to a gearbox subframe.

As used herein, the term "monolithic component" means that the component referred to is produced as a single piece rather than in multiple pieces.

As used herein, the term "substantially" means to a great extent or degree.

Figure 1:
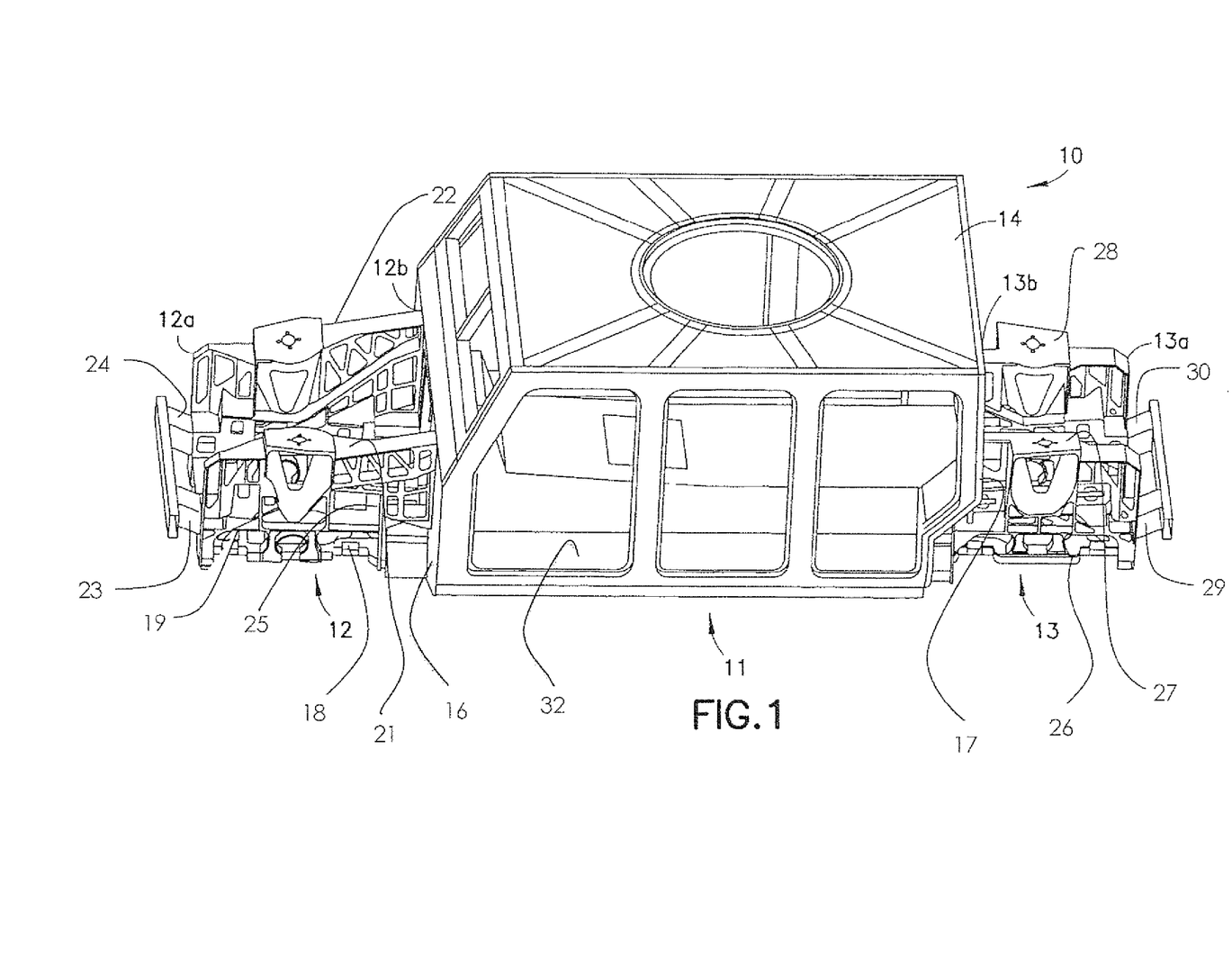
FIG. 1 is a perspective view of an embodiment of a combat tactical vehicle having a front module, center module and rear module in accordance with the present invention.

Referring to FIG. 1, a combat tactical vehicle 10 comprising a center frame module 11, a front frame module 12 and a rear frame module 13 in accordance with one embodiment of the present invention is shown. Front frame module 12 includes a distal end 12*a* and a proximal end 12*b*. Proximal end 12*b* of front frame module 12 may be attached to center frame module 11 of combat tactical vehicle 10 substantially in one step, significantly increasing the efficiency of assembling combat tactical vehicle 10. Rear frame module 13 includes a distal end 13*a* and a proximal end 13*b*. Proximal end 13*b* of rear frame module 13 may be attached to center frame module 11 of combat tactical vehicle 10 substantially in one step, significantly increasing the efficiency of assembling combat tactical vehicle 10.

In one embodiment, proximal end 12*b* front frame module 12 and proximal end 13*b* of rear frame module 13 are attached to center frame module 11 by a mechanical means, for instance, by the use of nuts and bolts, rivets, and the like are used to attach the various elements described in this disclosure, and may include rubber isolation mounts (i.e., bushings), where necessary, to minimize vibration between elements.

In one embodiment, the rear frame module is formed of longitudinal beams, wherein each of the longitudinal beams is provided by extruded aluminum. In one embodiment, the connectivity of the longitudinal beams is provided by nodes, wherein the nodes may comprise extrusions, forgings or castings of aluminum.

Figure 2:
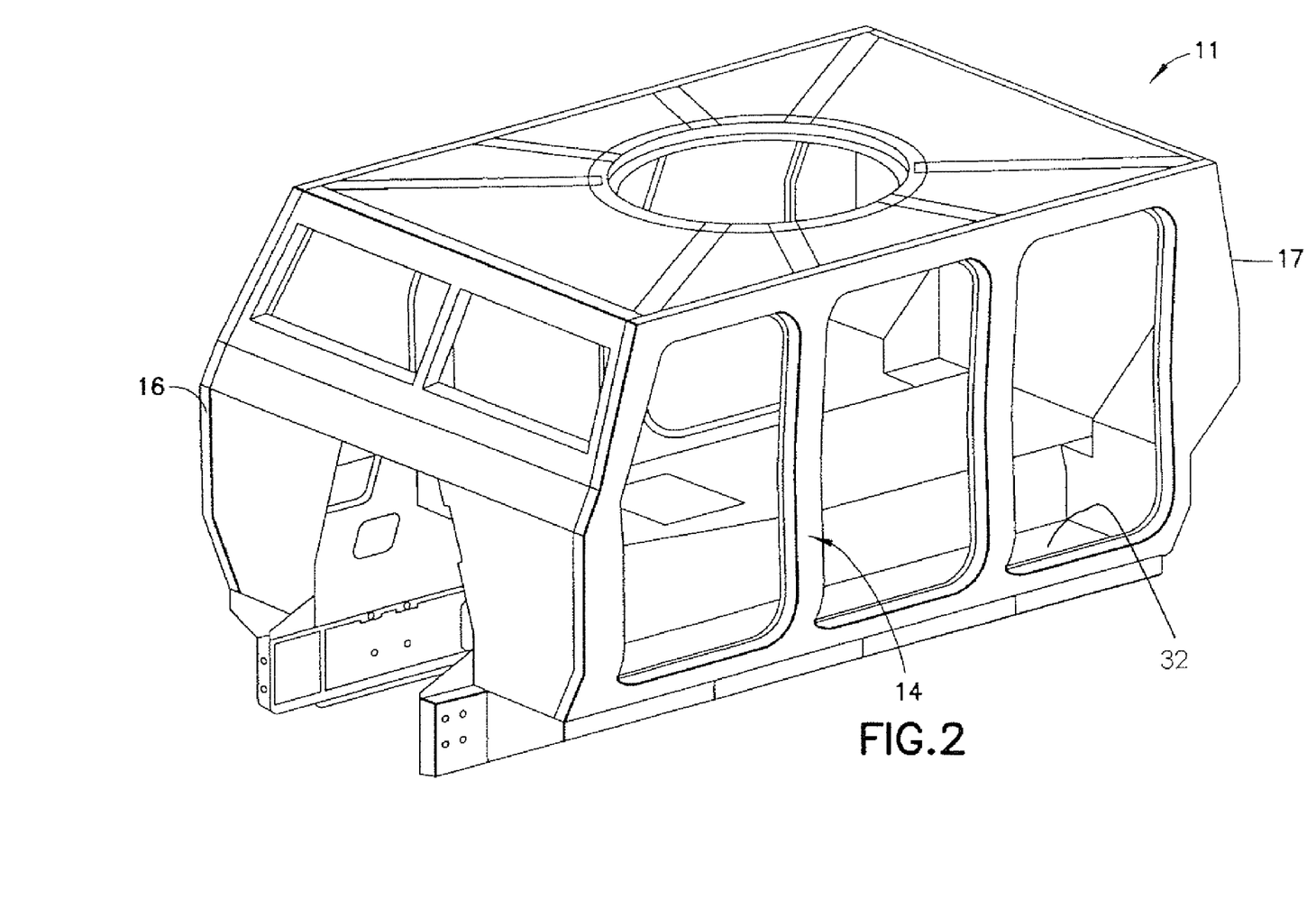
FIG. 2 is a perspective view of the center module of combat tactical vehicle of FIG. 1 in accordance with the embodiment of the present invention.

The center frame module 11 includes a cab portion 14 between a front bulkhead 16 and a rear bulkhead 17 that ultimately provides the crew compartment of the vehicle as shown in FIG. 2. In one embodiment, the center frame module 11 includes an integrated armor so that the integrated armor is a part of center frame module 11. In another embodiment, center frame module 11 has armor attached to the center frame module 11.

Cab portion 14 is designed for survivability of the crew; both bulkheads 16 and 17 are designed to defend against ballistic and mine blast threats. In the current vehicles, both bulkheads 16 and 17 are very difficult or impossible to be up-armored from the A-kit armor for lower level threats to B-Kit armor that is commonly installed/bolted on for upper level threats that occur during combat missions, and thus, B-Kit capabilities are commonly built in each vehicle which then has to carry more weight even during non-combat missions.

In one embodiment, cab portion 14 is provided by frame rails composed of a metal, such as an aluminum alloy. In one embodiment, the floor of the cab portion 32 is provided by a metal sheet or plate, such as an aluminum alloy. In one embodiment, the cab portion 14 of center frame module 11 is connected to the front and rear bulkheads 16 and 17 mechanically, such as by mechanical fasteners.

Figure 3:
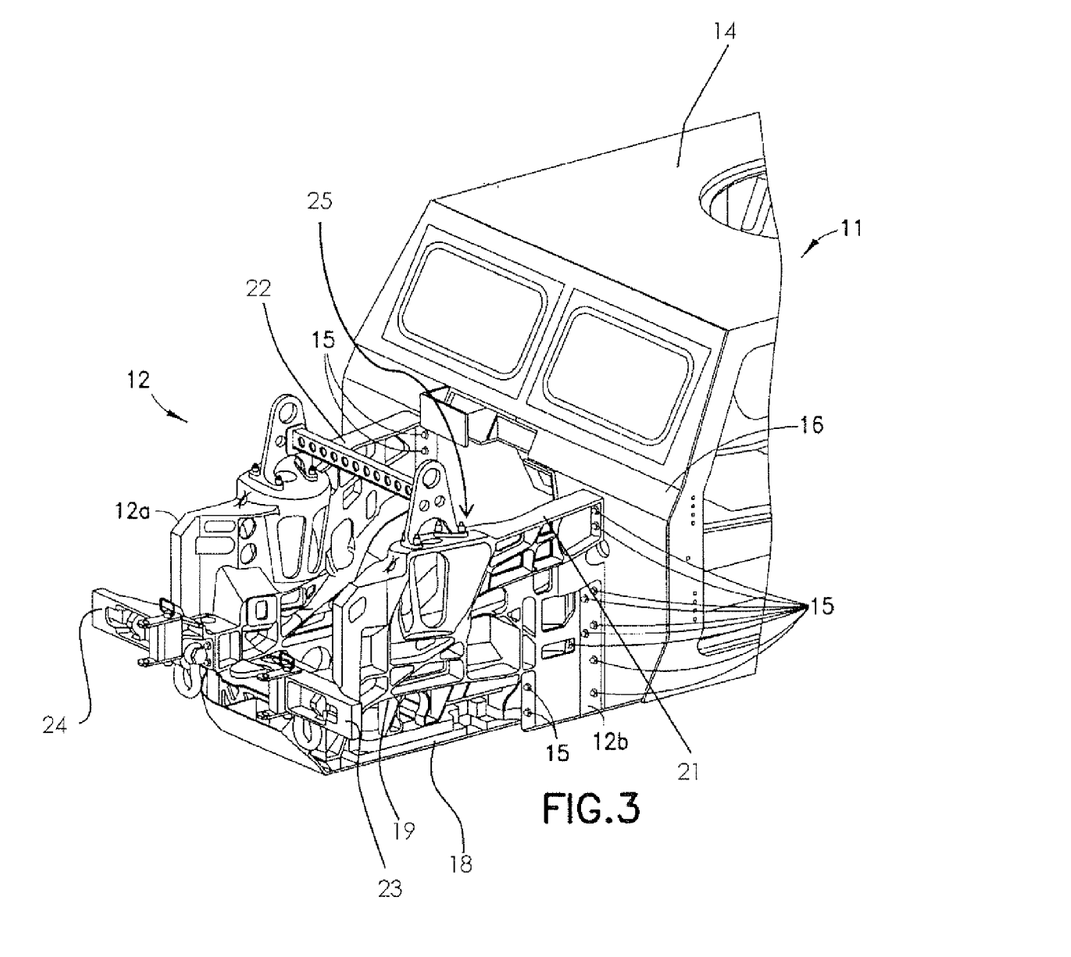
FIG. 3 is a perspective view of the front bulkhead of the center module of FIG. 1 in accordance with the embodiment of the present invention.

FIG. 3 shows a detailed view of front bulkhead 16 of center frame module 11. Front bulkhead 16 may include a first side facing an engine compartment of the combat vehicle and a second side facing a passenger compartment of the combat vehicle. Front bulkhead 16 serves as the base structural component that supports front frame module 12. The front frame module 12 is attached to center frame module 11 with multiple mechanical fasteners (i.e. bolts and nuts, Huck type fasteners, etc.), creating structural bolted joints designed to transfer all the pertinent structural design loads between modules. In one embodiment of the present invention, a plurality of bolted joints 15 are located in at least two directions, longitudinal and lateral as shown in FIG. 3. Note that only some of the bolted joints 15 are shown in FIG. 3. In one embodiment, bolted joints 15 surrounds the periphery of the proximal end 12b of front frame module 12.

In one embodiment, front bulkhead 16 provides attachment points to front frame module 12. Preferably, the front and rear modules 12 and 13 are attached to respective bulkheads 16 and 17 using mechanical fasteners that allow for a quick disassembly and replacement of either module with the new one, thus significantly reducing time of repair in the field service station, or service depot. Preferably, front bulkhead 16 is a thick aluminum plate (design drivers are ballistic and mine blast threats). In one embodiment, front bulkhead 16 includes mounting provisions for the front windshield frame, such as windshield support pillars. In another embodiment, front bulkhead 16 is made of an aluminum alloy casting or aluminum alloy forging.

Figure 4:
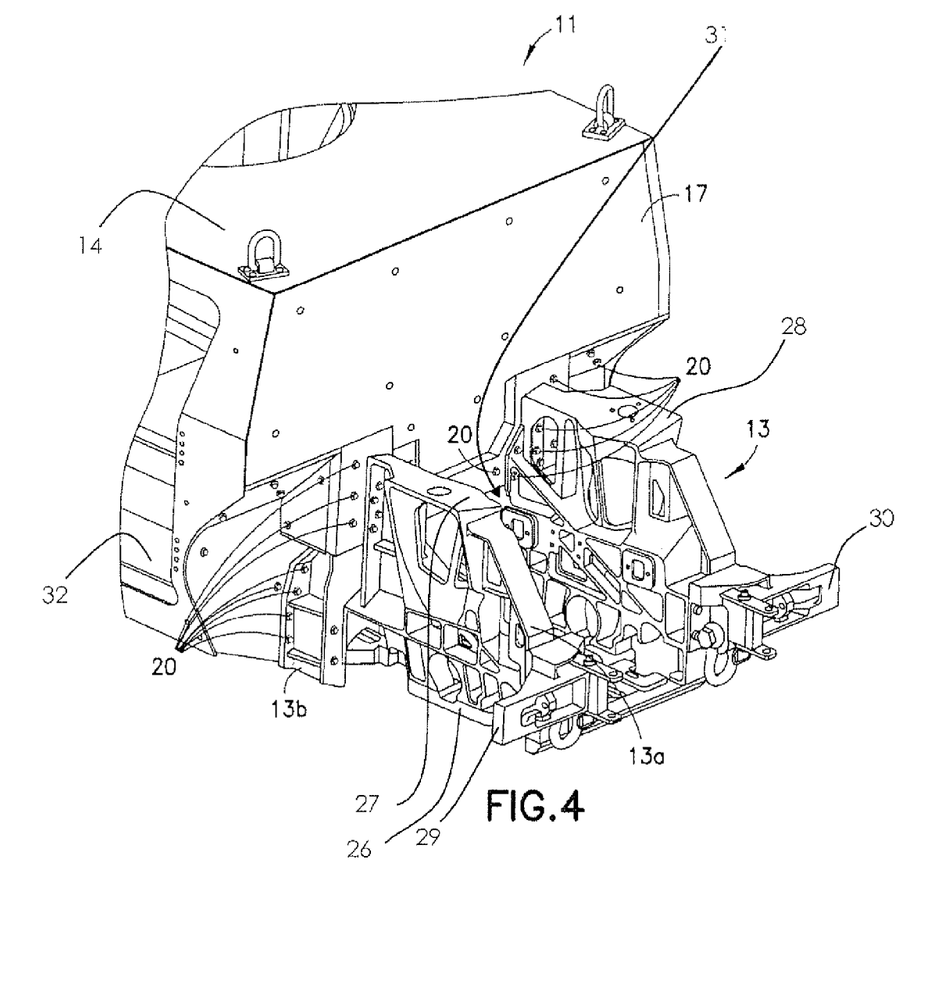
FIG. 4 is a perspective view of the rear bulkhead of the center module of FIG. 1 in accordance with the embodiment of the present invention.

FIG. 4 shows a detailed view of rear bulkhead 17 of center frame module 11. Rear bulkhead 17 may include a first side facing a gearbox compartment of the combat vehicle and a second side facing a passenger compartment of the combat vehicle. Rear bulkhead 17 serves as the base structural component that supports rear frame module 13. The rear frame module 13 is attached to center frame module 11 with multiple mechanical fasteners (i.e. bolts and nuts), creating structural bolted joints designed to transfer all the pertinent structural design loads between modules. In one embodiment of the present invention, a plurality of bolted joints 20 are located in at least two directions, longitudinal and lateral as shown in FIG. 4. Note that only some of the bolted joints 20 are shown in FIG. 4. In one embodiment, bolted joints 20 surrounds the periphery of the proximal end 13b of rear frame module 13.

In one embodiment, rear bulkhead 17 provides attachment points to rear frame module 13. Preferably, the front and rear modules 12 and 13 are attached to respective bulkheads 16 and 17 using mechanical fasteners that allow for a quick disassembly and replacement of either module with the new one, thus significantly reducing time of repair in the field service station, or service depot. Preferably, rear bulkhead 17 is a thick aluminum plate (design drivers are ballistic and mine blast threats). In one embodiment, rear bulkhead 17 includes mounting provisions for the rear door frame, such as door support pillars. In another embodiment, rear bulkhead 17 is made of an aluminum alloy casting or aluminum alloy forging.

Figure 5:
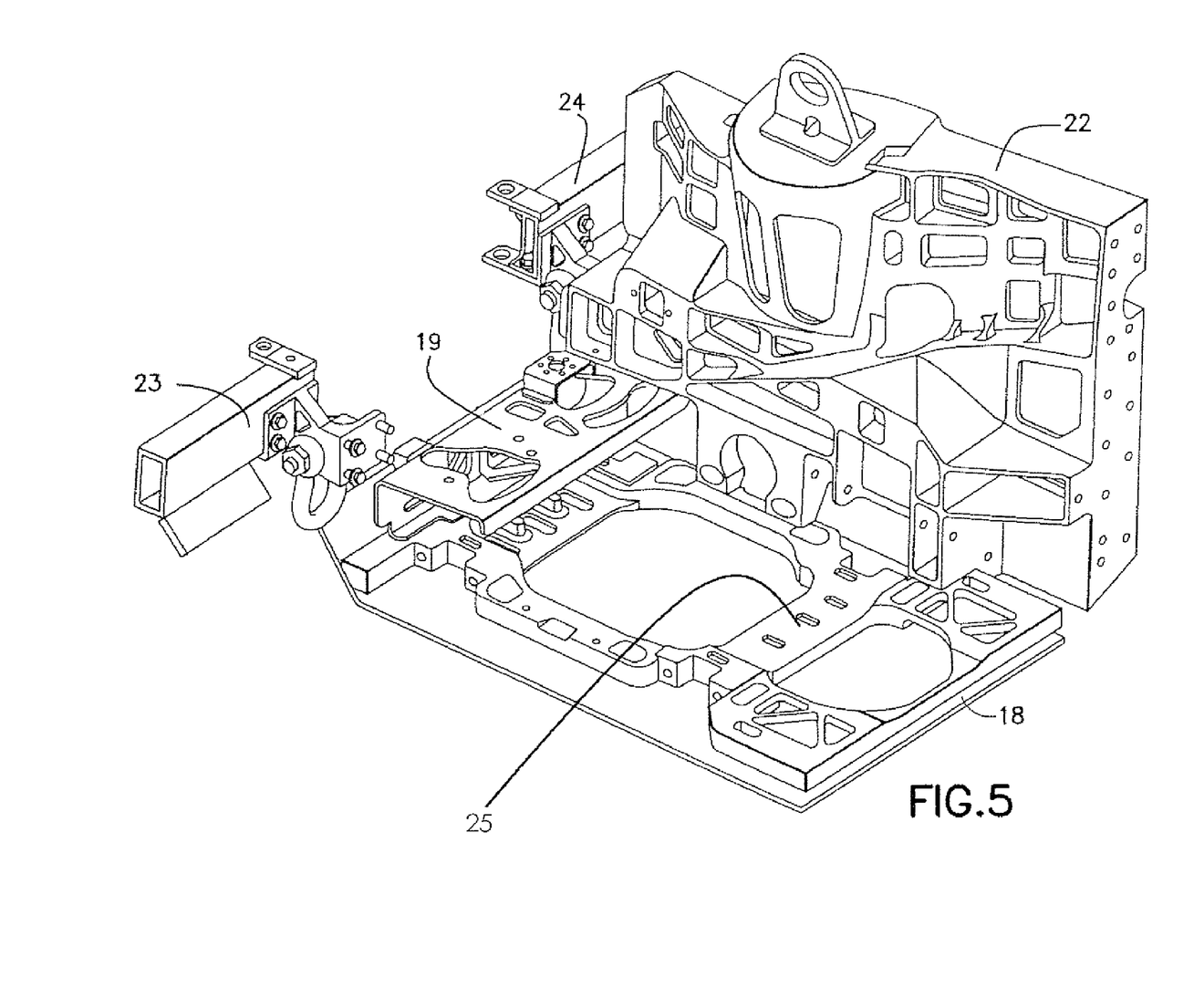
FIG. 5 is a partial perspective view of the front module of combat tactical vehicle of FIG. 1 in accordance with the embodiment of the present invention.
Figure 7:
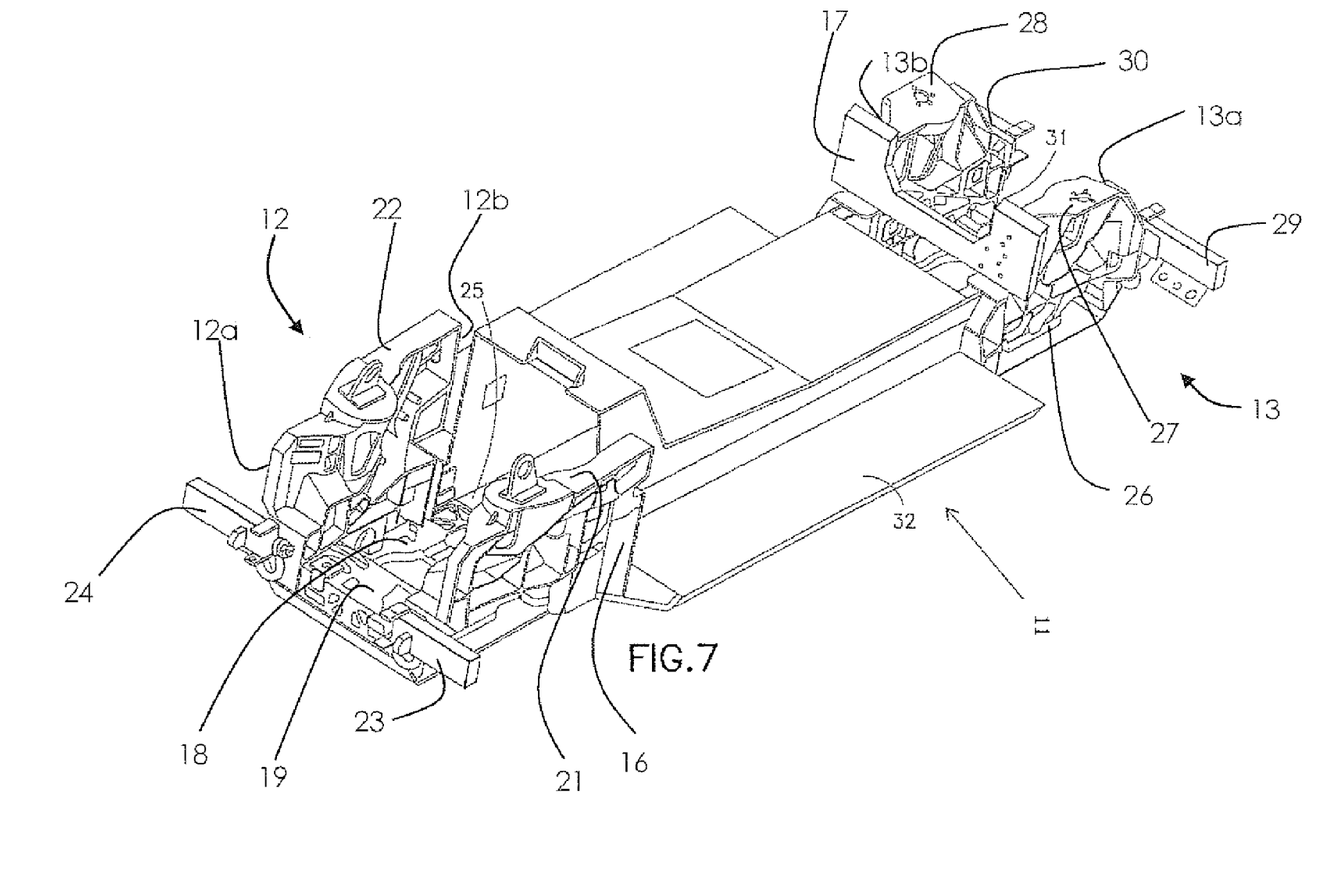
FIG. 7 is a perspective view of a combat tactical vehicle having a front module, center module without the cab frame and rear module in accordance with the embodiment of the present invention.

FIG. 5 shows a partial perspective view of front frame module 12 that includes a front chassis 18, a steering box mount assembly 19, a left side shock tower frame 21, a right side shock tower frame 22, a left side bumper system 23, a right side bumper system 24 and an engine subframe 25 (see FIG. 7). An engine (not shown) is preferably bolted onto front engine subframe 25 that is bolted on front frame module 12 in a conventional way used to build motor vehicles. In one embodiment, the front shock tower, steering box, and bumper beam are each preferably monolithic components made of an aluminum casting or aluminum forging or machined from aluminum plate. Each of these components could also consist (be sub-assembled using welding, structural adhesive bonding, mechanical fastening, or combination of these joining techniques) of multiple aluminum cast, forged, extruded, or machined plate components or any combination of those.

Figure 6:
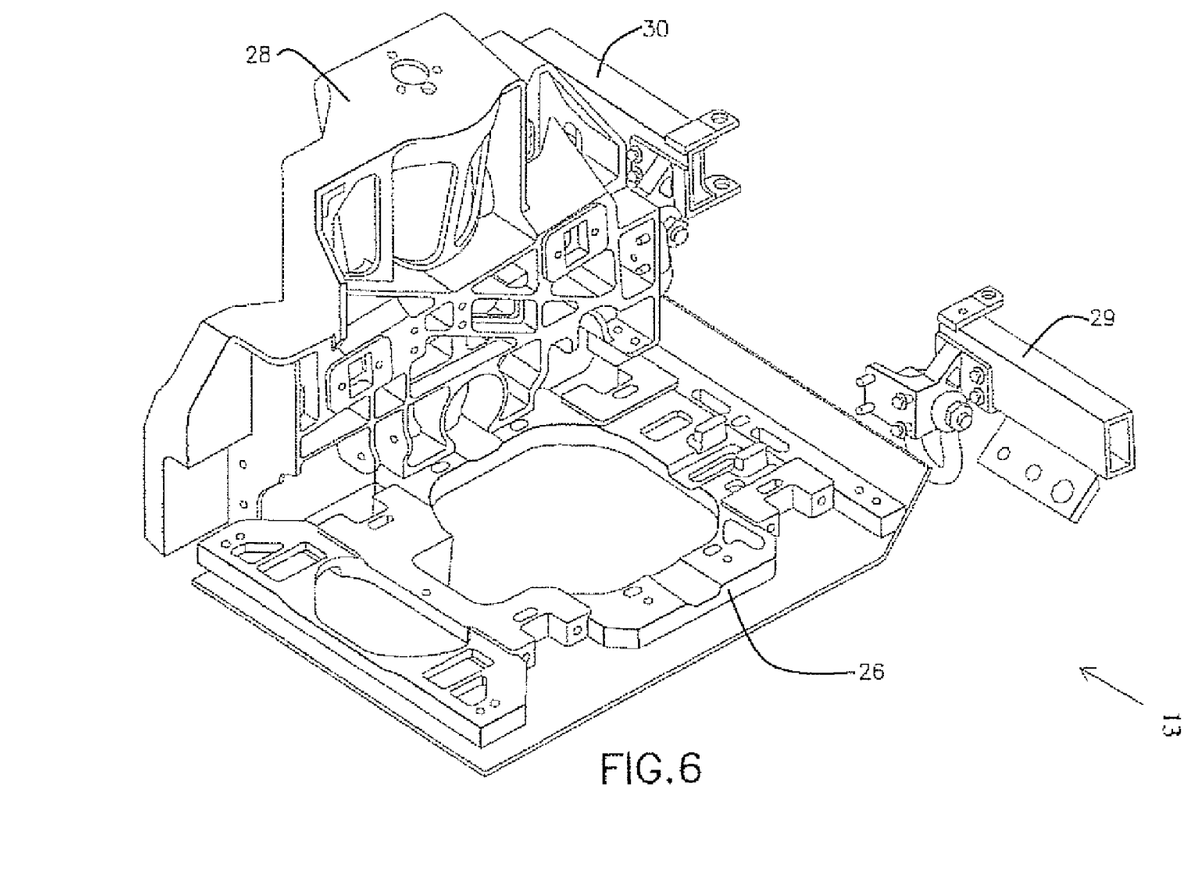
FIG. 6 is a partial perspective view of the rear module of combat tactical vehicle of FIG. 1 in accordance with the embodiment of the present invention.

FIG. 6 is a partial perspective view of rear frame module 13 that includes a rear chassis 26, left side shock frame 27, a right side shock frame 28, a left side bumper system 29, a right side bumper system 30 and a gearbox subframe 31. A gearbox (not shown) is preferably bolted onto rear gearbox subframe 31 that is bolted on rear frame module 13 in a conventional way used to build automobiles. The rear shock towers, gearbox subframe, and bumper beam are each preferably monolithic components made of an aluminum casting or aluminum forging or machined from aluminum plate. Each of these components could also consist (be sub-assembled using welding, structural adhesive bonding, mechanical fastening, or combination of these joining techniques) of multiple aluminum cast, forged, extruded, or machined plate components or any combination of those.

FIG. 7 shows combat tactical vehicle 10 where a chassis 32 of center frame module 11 is shown. Here, engine subframe 25 and gearbox subframe 31 are more clearly shown.

Figure 8:
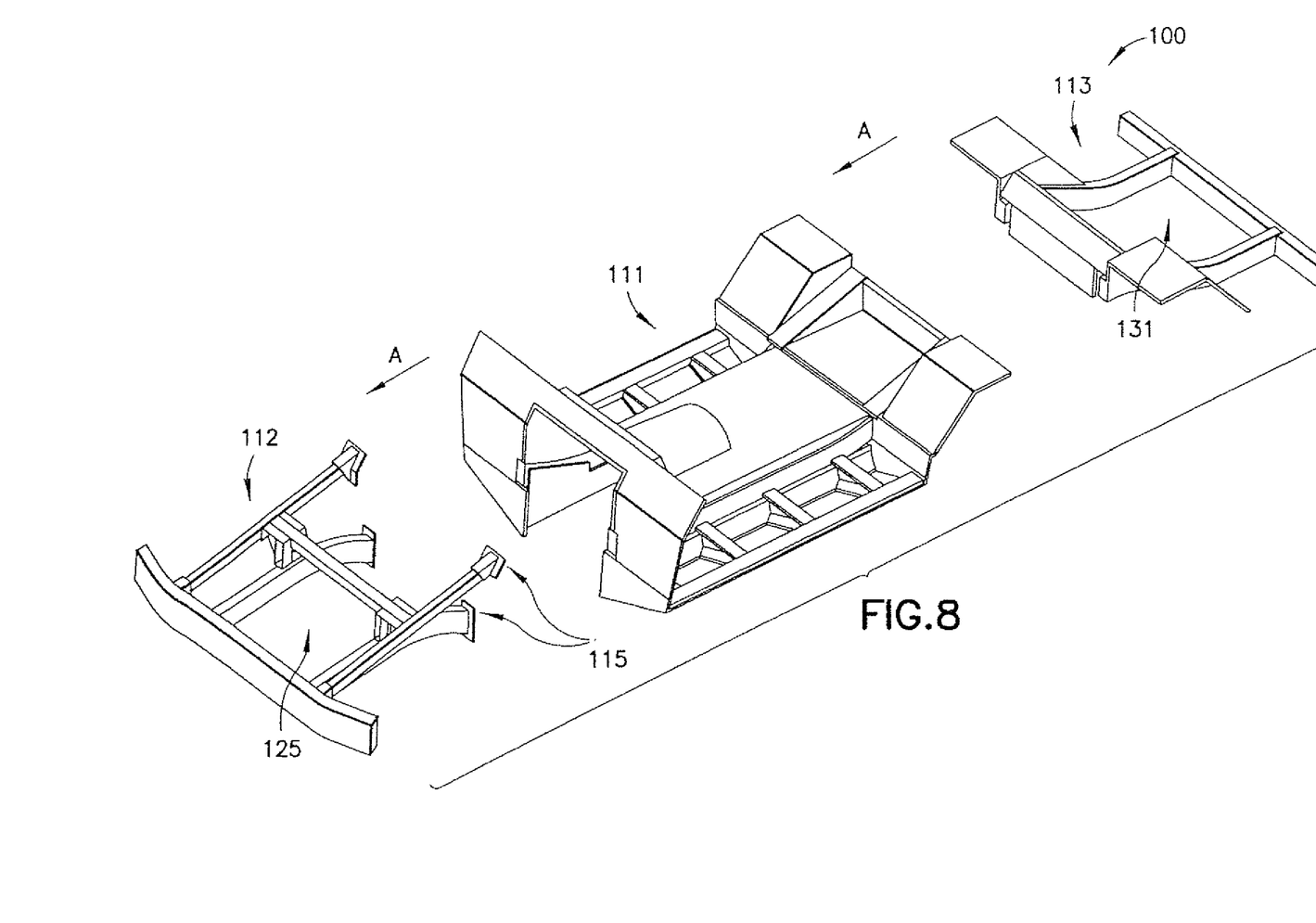
FIG. 8 is an exploded view of the combat tactical vehicle assembly in accordance with another embodiment of the present invention.

FIG. 8 shows an exploded view of another embodiment of the present invention of how a combat tactical vehicle 100 is assembled. Combat tactical vehicle 100 is assembled by bringing all three modules together as shown by arrows A. Here, a front frame module 112 and a rear frame module 113 are attached to a central module 111 by structural fasteners 115. Front frame module 112 includes an engine subframe 125. Rear frame module 113 includes a gearbox subframe 131.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:
1. A modular vehicle structure comprising:
   a center frame module comprising:
      a front bulkhead,
      a cab portion, and
      a rear bulkhead;
      wherein the center frame module includes an armor;
   a front frame module comprising:
      an engine subframe,
      wherein the front frame module is connected to the front bulkhead by a plurality of mechanical coupling devices;
      wherein the plurality of mechanical coupling devices provides for connecting and disconnecting the front frame module to the front bulkhead without substantially affecting the connection;
      wherein each of the plurality of mechanical coupling devices comprises a mechanical fastener;
      wherein the mechanical fasteners are located in at least a substantially longitudinal direction and a substantially lateral direction when connecting the front frame module to the front bulkhead of the center frame module; and
   a rear frame module comprising:
      a gearbox subframe,
      wherein the rear frame module is connected to the rear bulkhead by the plurality of mechanical coupling devices;

wherein the plurality of mechanical coupling devices provides for connecting and disconnecting the rear frame module to the rear bulkhead without substantially affecting the connection;

wherein each of the plurality of mechanical coupling devices comprises a mechanical fastener;

wherein the mechanical fasteners are located in at least a substantially longitudinal direction and a substantially lateral direction when connecting the rear frame module to the rear bulkhead of the center frame module.

2. The modular vehicle structure of claim 1, wherein the plurality of mechanical fasteners comprises a plurality of bolts.

3. The modular vehicle structure of claim 2, further comprising a plurality of corresponding nuts to each bolt.

4. The modular vehicle structure of claim 1, wherein the front bulkhead is made of a cast or forged aluminum alloy.

5. The modular vehicle structure of claim 1, wherein the front bulkhead is made of a sheet or plate aluminum alloy product.

6. The modular vehicle structure of claim 1, wherein the rear bulkhead is made of a cast or forged aluminum alloy.

7. The modular vehicle structure of claim 1, wherein the rear bulkhead is made of a sheet or plate aluminum alloy product.

8. The modular vehicle structure of claim 1, wherein the cab portion comprises a plurality of frame rails and a floor.

9. The modular vehicle structure of claim 8, wherein the plurality of frame rails is made of an aluminum alloy.

10. The modular vehicle structure of claim 8, wherein the floor is made of an aluminum alloy sheet or plate.

* * * * *